US006953050B2

(12) United States Patent
Cavagna

(10) Patent No.: US 6,953,050 B2
(45) Date of Patent: Oct. 11, 2005

(54) FLOAT, PARTICULARLY FOR LEVEL CONTROL IN BOTTLES OF LIQUEFIED GAS AND THE LIKE

(75) Inventor: Davide Cavagna, Ponte S. Marco Di Calcinato (IT)

(73) Assignee: Cavagna Group Switzerland SA (CH)

( * ) Notice: Subject to any disclaimer, the term of this patent is extended or adjusted under 35 U.S.C. 154(b) by 0 days.

(21) Appl. No.: 10/685,645

(22) Filed: Oct. 15, 2003

(65) Prior Publication Data

US 2005/0081919 A1 Apr. 21, 2005

(51) Int. Cl.$^7$ ............................................. F16K 31/18
(52) U.S. Cl. .................... 137/434; 137/446; 141/198
(58) Field of Search ................ 137/423, 434, 137/435, 436, 437, 446, 429, 430, 433; 73/305, 309, 317, 322.5, 306, 307; 141/198; 340/623, 624

(56) References Cited

U.S. PATENT DOCUMENTS

| | | | | |
|---|---|---|---|---|
| 41,999 A | * | 3/1864 | Jasper | 137/423 |
| 1,725,874 A | * | 8/1929 | Long | 73/322.5 |
| 2,023,461 A | * | 12/1935 | Butler | 137/423 |
| 2,345,054 A | * | 3/1944 | Korevec | 73/322.5 |
| 2,626,594 A | | 1/1953 | Kimmell | |
| 3,207,170 A | * | 9/1965 | Fulton | 137/436 |
| 3,306,106 A | * | 2/1967 | Glasgow | 73/322.5 |
| 3,320,922 A | * | 5/1967 | Taylor et al. | 73/317 |
| 3,463,843 A | * | 8/1969 | Taylor et al. | 264/68 |
| 3,484,774 A | * | 12/1969 | Borgakke | 340/624 |
| 3,673,587 A | * | 6/1972 | Baruch | 340/450 |
| 3,688,795 A | | 9/1972 | Taylor | |
| 4,278,105 A | * | 7/1981 | Koomey | 137/423 |
| 4,635,480 A | * | 1/1987 | Hrncir et al. | 73/322.5 |
| 4,714,088 A | * | 12/1987 | Ivins | 137/423 |
| 4,838,303 A | * | 6/1989 | Goans | 137/423 |
| 5,072,618 A | * | 12/1991 | Taylor et al. | 73/317 |
| 5,992,445 A | * | 11/1999 | Pagani | 141/198 |
| 6,079,438 A | * | 6/2000 | Cavagna | 137/446 |

FOREIGN PATENT DOCUMENTS

| | | | | |
|---|---|---|---|---|
| BE | 506032 | * | 10/1951 | 137/434 |
| DE | 457734 | * | 3/1928 | 137/434 |
| DE | A- 21 38 945 | | 2/1973 | |
| FR | A-1 406 202 | | 7/1965 | |

OTHER PUBLICATIONS

International Search Report for EP 01 83 0355 dated Jan. 21, 2002.

* cited by examiner

Primary Examiner—Kevin Lee
(74) Attorney, Agent, or Firm—Cantor Colburn LLP

(57) ABSTRACT

A float, particularly for level control in bottles of liquefied gas and the like, comprising a float body associated with an element for connection to a valve unit, the float body being constituted by an internally hollow element made of plastics whose shape is defined by a plurality of mutually intersecting spherical bodies.

7 Claims, 2 Drawing Sheets

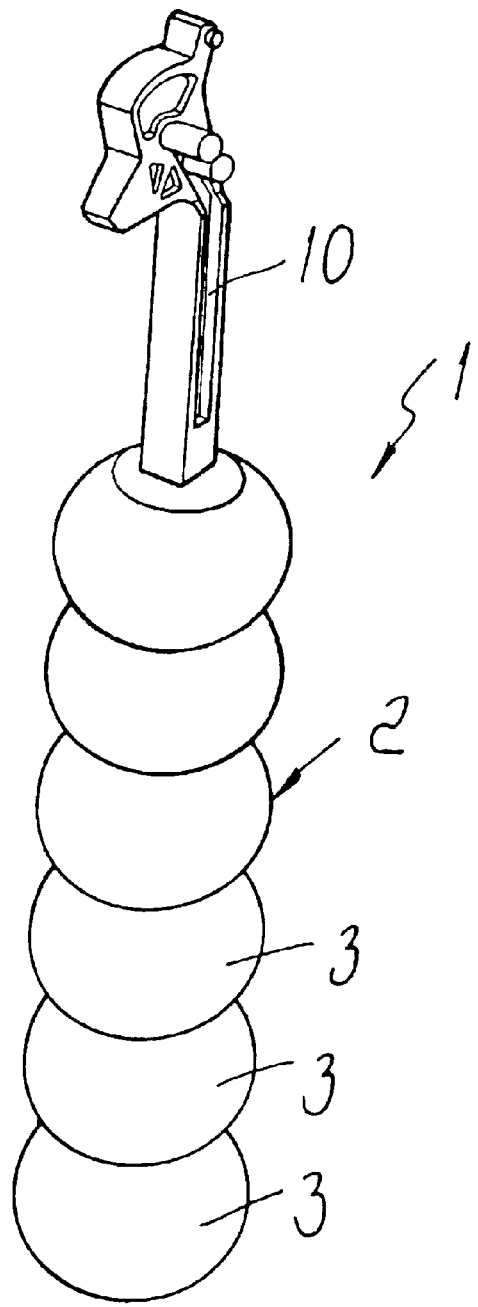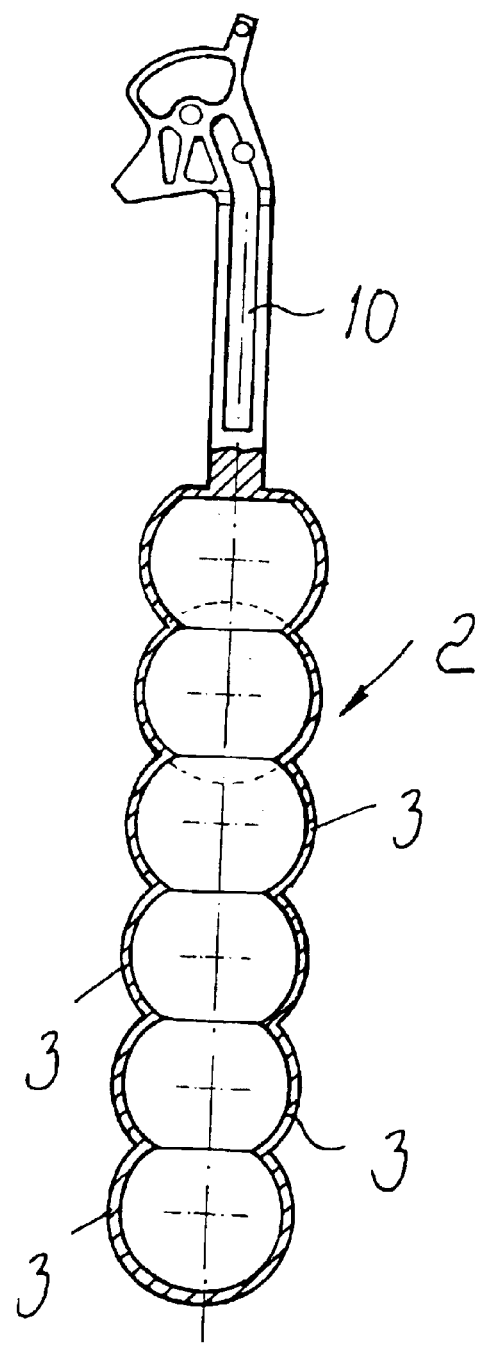

FLOAT, PARTICULARLY FOR LEVEL CONTROL IN BOTTLES OF LIQUEFIED GAS AND THE LIKE

BACKGROUND OF THE INVENTION

The present invention relates to a float, particularly for level control in bottles of liquefied gas and the like.

It is known that, currently, floats designed to act as level sensors are increasingly often introduced in bottles of liquefied gases and the like.

Such floats are generally made of expanded materials or by interconnecting molded parts made of plastics, bearing in mind that a density of approximately 0.3 kg/dm$^3$ is required for good operation.

These solutions, which are currently widely adopted, are capable of withstanding limited pressure values but are unable to withstand without deforming higher pressures, such as approximately 50 bar, which would inevitably cause the compression of the float body, with a consequent considerable increase in density and malfunction of the level unit.

SUMMARY OF THE INVENTION

The aim of the invention is to eliminate the above mentioned drawbacks, by providing a float, particularly for level control in bottles of liquefied gases and the like, which allows to produce the body of the float by using plastics, so as to achieve high resistance to compression thereby complying with the strictest standards.

Within this aim, a particular object of the invention is to provide a float which combines optimum mechanical strength with a sufficiently low density so that it can be easily used as a level sensor in bottles and the like.

Another object of the present invention is to provide a float which, thanks to its particular constructive characteristics, is capable of giving the greatest guarantees of reliability and safety in use.

Another object of the present invention is to provide a float, particularly for level control in bottles of liquefied gas and the like, which can be easily obtained starting from commonly commercially available elements and materials and is also competitive from a merely economical point of view.

This aim and these and other objects which will become better apparent hereinafter are achieved by a float particularly for level control in bottles of liquefied gas and the like, according to the invention, comprising a float body associated with an element for connection to a valve unit, characterized in that said float body is constituted by an internally hollow element made of plastics whose shape is defined by a plurality of mutually intersecting spherical bodies.

BRIEF DESCRIPTION OF THE DRAWINGS

Further characteristics and advantages will become better apparent from the description of preferred but not exclusive embodiments of a float particularly for level control in bottles of liquefied gas and the like, illustrated only by way of non-limitative example in the accompanying drawings, wherein:

FIG. 1 is a schematic perspective view of a monolithic float;

FIG. 2 is a partially sectional view of the float of FIG. 1;

DESCRIPTION OF THE PREFERRED EMBODIMENTS

Figure 3:
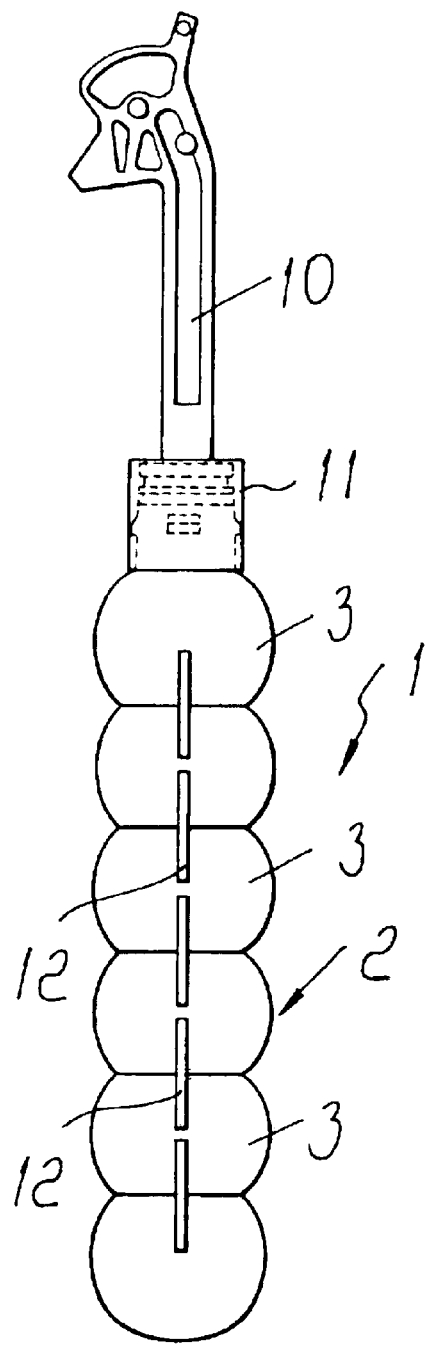
FIG. 3 is a side elevation view of a float obtained by coupling a float body and a connecting element.

With reference to the figures, the float, particularly for level control in bottles of liquefied gas and the like, according to the invention, generally designated by the reference numeral 1, comprises a float body 2 which has the particularity of being manufactured by blow-molding plastic material.

In order to obtain an optimum value of resistance to compression pressure, the float body 2 is formed as a hollow body whose shape results from the side-by-side arrangement, with mutual interference, of a plurality of spherical elements 3 which therefore in practice intersect each other.

Advantageously, the axis of the spherical elements lies along a straight line and the mutual distance between the centers of adjacent spherical bodies 3 is smaller than the diameter of a spherical body and greater than its radius.

The float body 2 is connected by a connecting element 10 to a valve unit which is formed monolithically with the spherical bodies 3 in the embodiment shown in FIGS. 1 and 2.

Figure 4:
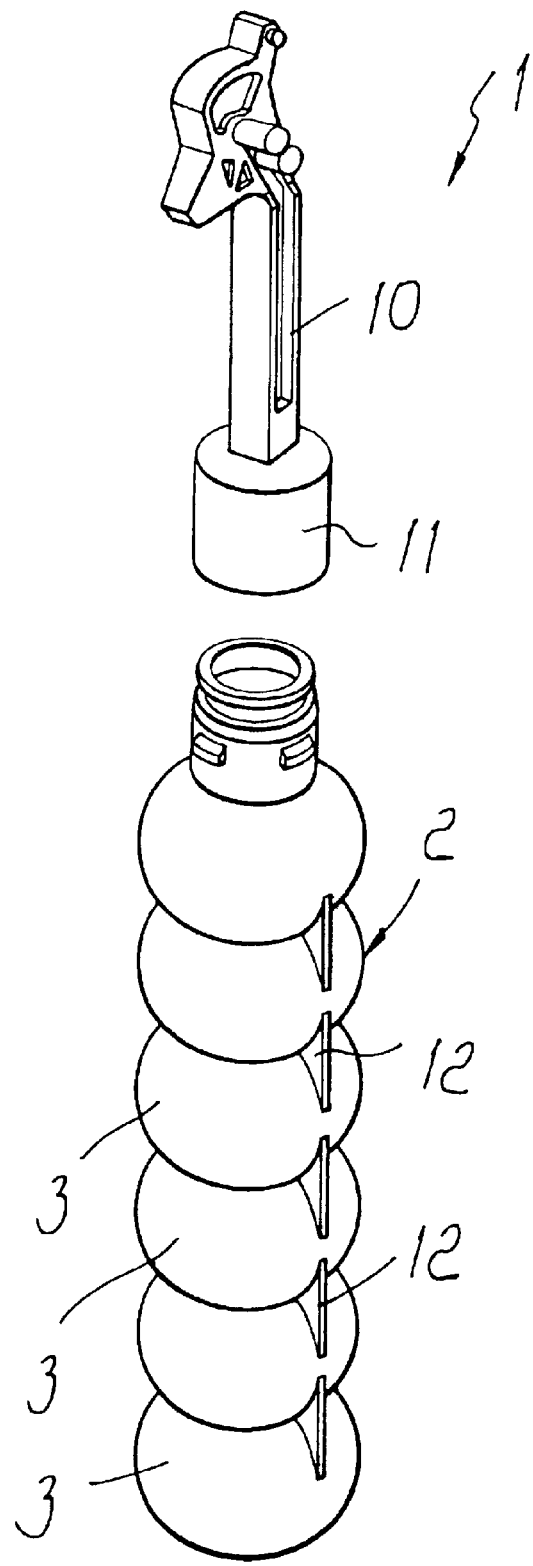
FIG. 4 is a schematic exploded perspective view of a float, in which the float body and the connecting element are shown separated.

Optionally, as indicated in FIGS. 3 and 4, the connecting element 10 can be provided with a coupling tang 11 which allows connection to the float body, designated by the reference numeral 2.

The connecting element can be directly overmolded with respect to the float body or can optionally be connected mechanically.

As shown in FIGS. 3 and 4, the ribs 12 formed by the closure of the blow-molding mold can optionally be left between the spherical bodies or can be removed, as shown in FIGS. 1 and 2.

With the above described solution, therefore, the provision of undulations and ribs on the blow-molded plastics allows to achieve the necessary mechanical strength despite having a low density.

From the above description it is thus evident that the invention achieves the intended aim and objects, and in particular the fact is stressed that the use of plastics blow-molding technology allows to obtain a product with undulations and ridges which is capable of providing the intended mechanical strength while having a low density.

The invention thus conceived is susceptible of numerous modifications and variations, all of which are within the scope of the appended claims.

All the details may further be replaced with other technically equivalent elements.

In practice, the materials used, as well as the dimensions and the contingent shapes, may be any according to requirements.

What is claimed is:

1. A float particularly for level control in bottles of liquefied gas and the like, comprising a float body associated with an element for connection to a valve unit, wherein said float body is constituted by an internally hollow element made of plastics whose shape is defined by a plurality of mutually intersecting spherical bodies, centers of said spherical bodies being arranged along a straight line so that said spherical bodies are arranged in a stacked relationship, mutual distance between said centers of adjacent spherical bodies being smaller than a diameter of each spherical body and greater than a radius thereof.

2. The float according to claim 1, wherein said centers of said spherical bodies are arranged on the extension of said connecting element.

3. The float according to claim 1, wherein element for connection to a valve unit is formed monolithically with said float body.

4. The float according to claim 1, wherein said float body is produced by blow-molding plastic material.

5. The float according to claim 1, wherein said connecting element for connection to a valve unit is mechanically associated with said float body.

6. The float according to claim 1, wherein said connecting element for connection to a valve unit comprises a tang, said tang being connectable to said float body.

7. A float particularly for level control in bottles of liquefied gas and the like, comprising a float body associated with an element for connection to a valve unit, wherein said float body is constituted by an internally hollow element made of plastics whose shape is defined by a plurality of mutually intersecting spherical bodies that are joined to one another at respective open ends thereof and that are arranged in a stacked relationship and wherein said float body has external ribs which are integrally molded with and join said spherical bodies at opposite sides at the joined open ends.

* * * * *